United States Patent [19]

Capps

[11] Patent Number: 4,586,726
[45] Date of Patent: May 6, 1986

[54] FIFTH WHEEL WITH STOP MEANS

[76] Inventor: Grover H. Capps, Rte. 2, Box 388, Travelers Rest, S.C. 29690

[21] Appl. No.: 597,928

[22] Filed: Apr. 9, 1984

[51] Int. Cl.$^4$ .............................................. B62D 53/08
[52] U.S. Cl. ..................................... 280/432; 280/433
[58] Field of Search ................................ 280/432, 433

[56] References Cited

U.S. PATENT DOCUMENTS

| | | | |
|---|---|---|---|
| 2,738,988 | 3/1956 | Claussen et al. | 280/432 |
| 3,463,512 | 8/1969 | Hodgson | 280/433 |
| 4,119,330 | 10/1978 | Capps | 280/432 |
| 4,480,849 | 11/1984 | Yano et al. | 280/433 |

*Primary Examiner*—David M. Mitchell
*Assistant Examiner*—Donn McGiehan
*Attorney, Agent, or Firm*—Cort Flint

[57] ABSTRACT

A fifth wheel is illustrated having laterally extending wedge-shaped integral continuations of the fifth wheel for engaging a stop carried beneath the bottom surface of the trailer to limit angular movement between the tractor and trailer. Grease fittings and passageways are provided for greasing the upper surfaces of the wedge-shaped projections so as to facilitate their support of the trailer during turning. The connecting and operating of the tractor-trailer rig is facilitated by the application of grease to these upper surfaces which due to their extreme lateral disposition, engage the lower surface of the trailer magnifying the need for the application of grease.

6 Claims, 8 Drawing Figures

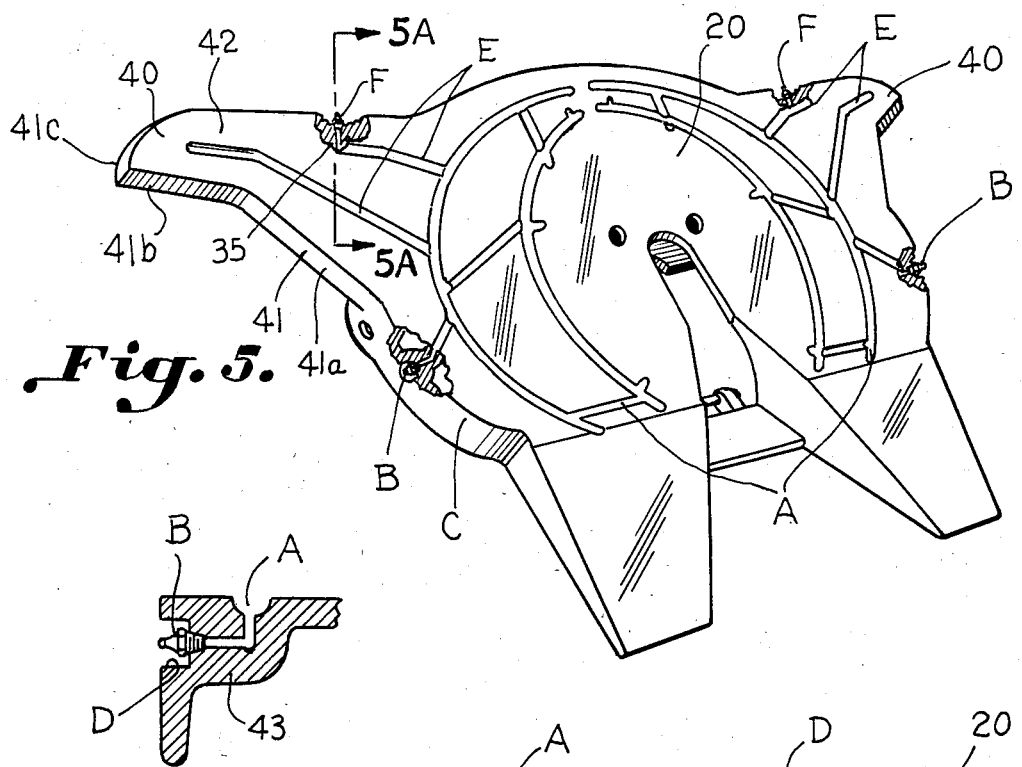
Fig. 5.
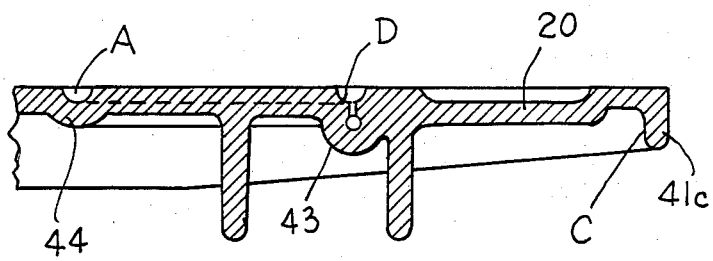
Fig. 5A.
Fig. 7.
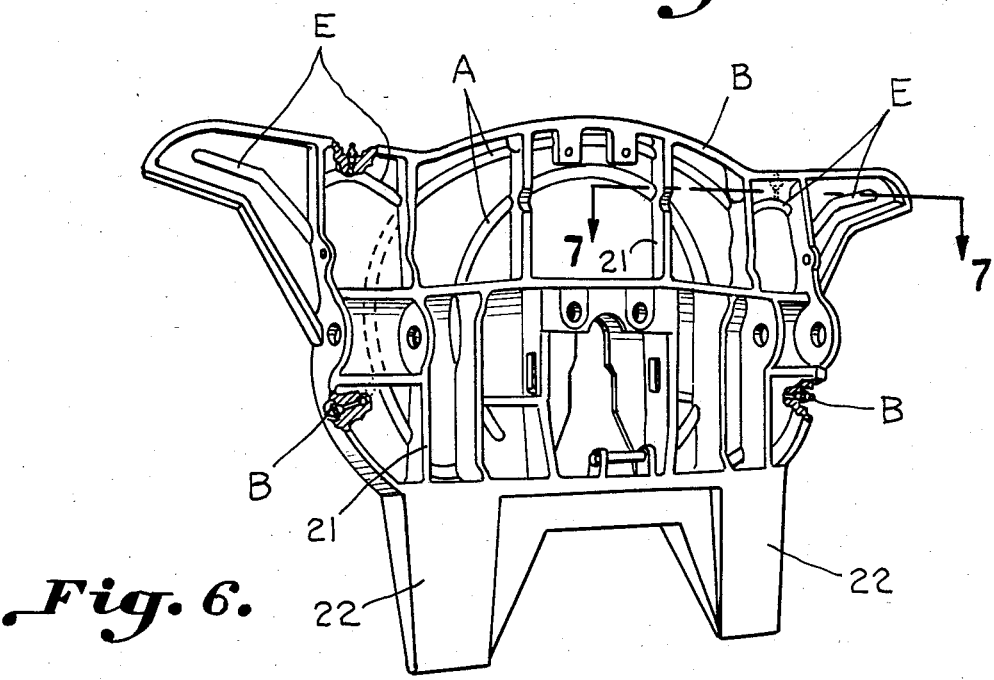
Fig. 6.

FIFTH WHEEL WITH STOP MEANS

BACKGROUND OF THE INVENTION

Herefore, a fifth wheel has been provided having outwardly projecting ears which are attached thereto by welding as illustrated in U.S. Pat. No. 4,119,330. These ears are adapted to be engaged by a stop carried by the underside of the trailer when the trailer is pivoted in extreme angular position on either side. It has long been recognized that it is important to limit the angular movement of the trailer with respect to the trailer in order to avoid damage to the vertical exhaust system carried just to the rear of and adjacent the sides of the cab of the tractor. Moreover, such limitation of movement of the trailer in respect of the tractor may in certain circumstances act as a deterent to jack-knifing of the tractor-trailer rig.

It is desirable to construct the fifth wheel in an integral configuration so that the wedge-shaped ears or stops which extend laterally of the fifth wheel side skirt portions may function in order to stabilize the rig while affording positive abutment or stop means for engagement by the stop mechanism carried by the trailer. In order to provide lateral stabilization of the trailer through engagement between the underside of the trailer with a laterally positioned ear, depending upon the direction in which the trailer tends to tilt, it is necessary that lubricating means be provided for the respective engaging surfaces. It is desirable that this be done through the application of grease to the fifth wheel. While grease channels have heretofore been provided in the upper surface of fifth wheels as illustrated in U.S. Pat. No. 4,119,330 such was not so critical because there was no integral surface projecting laterally of the side skirt portions presenting a special need for the continuous application of grease due to the magnified contact between the fifth wheel and the trailer at the wedge-shaped portions. By thus providing an integral construction such may be more rugged for providing lateral stability through engagement of adjacent surfaces. Adequate lubrication may be provided without impairment of strength in the fifth wheel.

Accordingly, it is an important object of this invention to provide a fifth wheel having integral wedge-shaped stop members extending laterally of the fifth wheel for providing stability and a rugged abutment or stop means for limiting the movement of the trailer with respect to the tractor while affording stability with adequate greasing of the laterally remote wedge portions of the fifth wheel.

SUMMARY OF THE INVENTION

It has been found that an effective stop mechanism for limiting the angular relationship between the tractor and the trailer so as to avoid damage to the rig through contact between tractor body portions and the trailer may be effectively provided through the use of integral lateral wedge-shaped projections which extend beyond the fifth wheel for providing stability to the trailer while at the same time presenting an abutment which is not likely to be sheared away and which is capable of adequate application of grease to facilitate stabilization of the trailer by contact with the underside thereof.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is a perspective view further illustrating the fifth wheel together with the lubricating system carried within circumferentially spaced housings carried within the skirt of the fifth wheel for facilitating lubrication of the integral upper portions of the laterally extending wedge-shaped stop members, FIG. 5A is a transverse sectional elevation taken on the line 5A in FIG. 5, FIG. 6 is a perspective view illustrating the underside of the fifth wheel, and FIG. 7 is a sectional elevation taken on the line 7—7 in FIG. 6 further illustrating the lubricating system for the wedge-shaped stop members.

DESCRIPTION OF A PREFERRED EMBODIMENT

Figure 1:
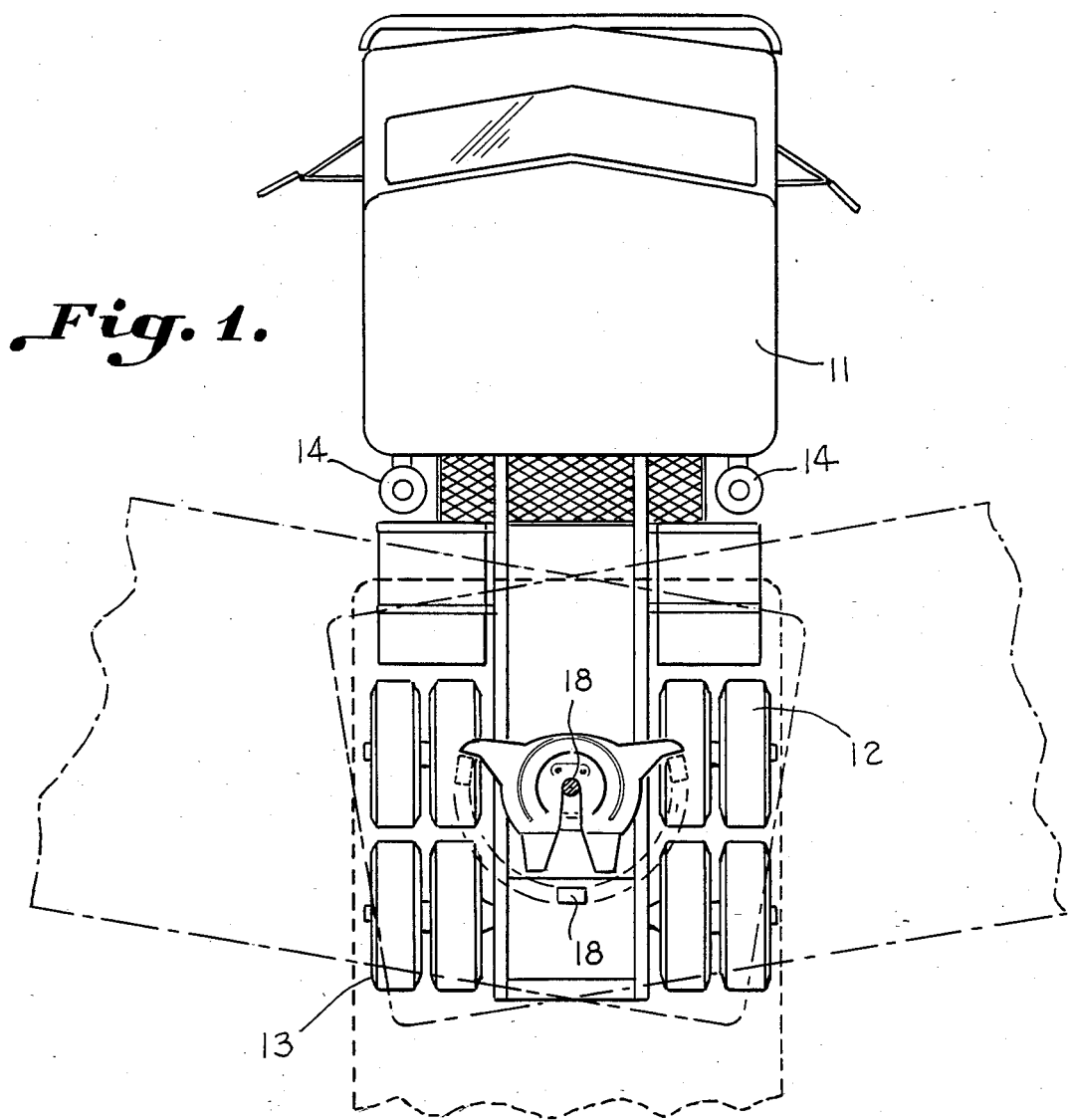
FIG. 1 is a top plan view illustrating a fifth wheel carried by a tractor with the trailer illustrated in broken lines to indicate limitations or relative angular movement thereof.
Figure 2:
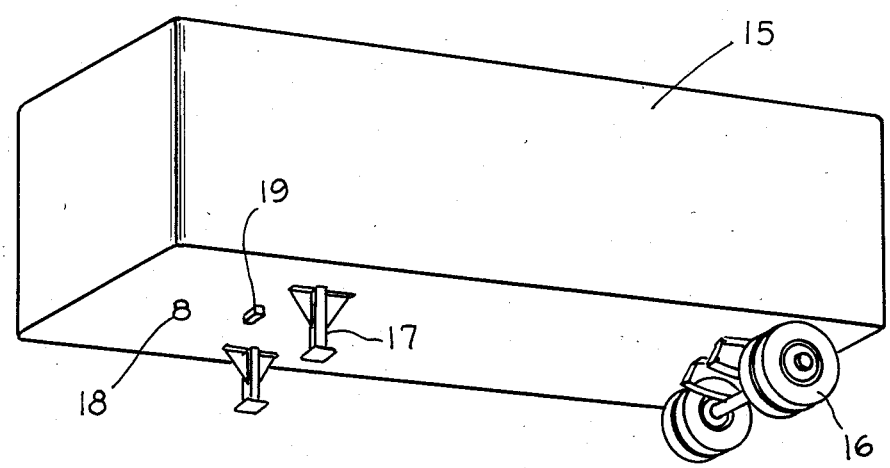
FIG. 2 is a perspective view illustrating a stop carried by the underside of the trailer as well as the pin for connecting the trailer to the fifth wheel.

The drawings illustrate a fifth wheel for use in connecting a tractor and trailer having a stop carried beneath a bottom surface of the trailer. A plurality of interconnected grease channels A open in a bearing surface of an upper plate of the fifth wheel. A pair of opposed grease fittings B are adapted to accommodate a grease gun and the like opening into a passageway communicating with the grease channels. A depending skirt C is carried by the upper plate and contains a compartmentalized lower portion. A plurality of circumferentially spaced housings D in the skirt open at the outside thereof accommodating each of the grease fittings. Wedge-shaped integral continuations of the skirt extend laterally beyond the skirt on each side of the fifth wheel and integral extensions of the upper plate form spaced opposed ears carried by a forward portion of the fifth wheel for respective engagement by the stop limiting the angle between the tractor and trailer during turning. Grease channels E are contained in an upper surface of each of the opposed ears. A pair of grease fittings F are carried in spaced housings in a forward portion of said skirt communicating with the grease channels in an upper surface of each of the opposed ears. The pair of opposed grease fittings B positioned in side portions of the fifth wheel also communicate with the grease channels in the upper plate portions of the opposed ears. The first mentioned grease channels communicate with the grease channels in the opposed ears.

The fifth wheel is carried by the rear chassis 10 of the tractor behind the cab 11. The fifth wheel is shown positioned between the pairs of double wheels 12 and 13 which support the rear of the tractor. A vertical exhaust system 14 is positioned immediately behind and adjacent the sides of the cab 11 in a customary fashion. When driving the rig in close places, such as terminals or delivery points for cargo, backing and turning may be such as to cause the trailer to become disposed at an extreme angle with respect to the tractor so that the trailer engages the exhaust system or otherwise causes damage as to the cab itself.

The trailer 15 has rear wheels 16 and is provided with the usual support stand 17. A king pin 18 is provided for connecting the trailer to the fifth wheel and a stop 19 is provided in the form of a block securely mounted to the underside of the trailer 15.

Figure 3:
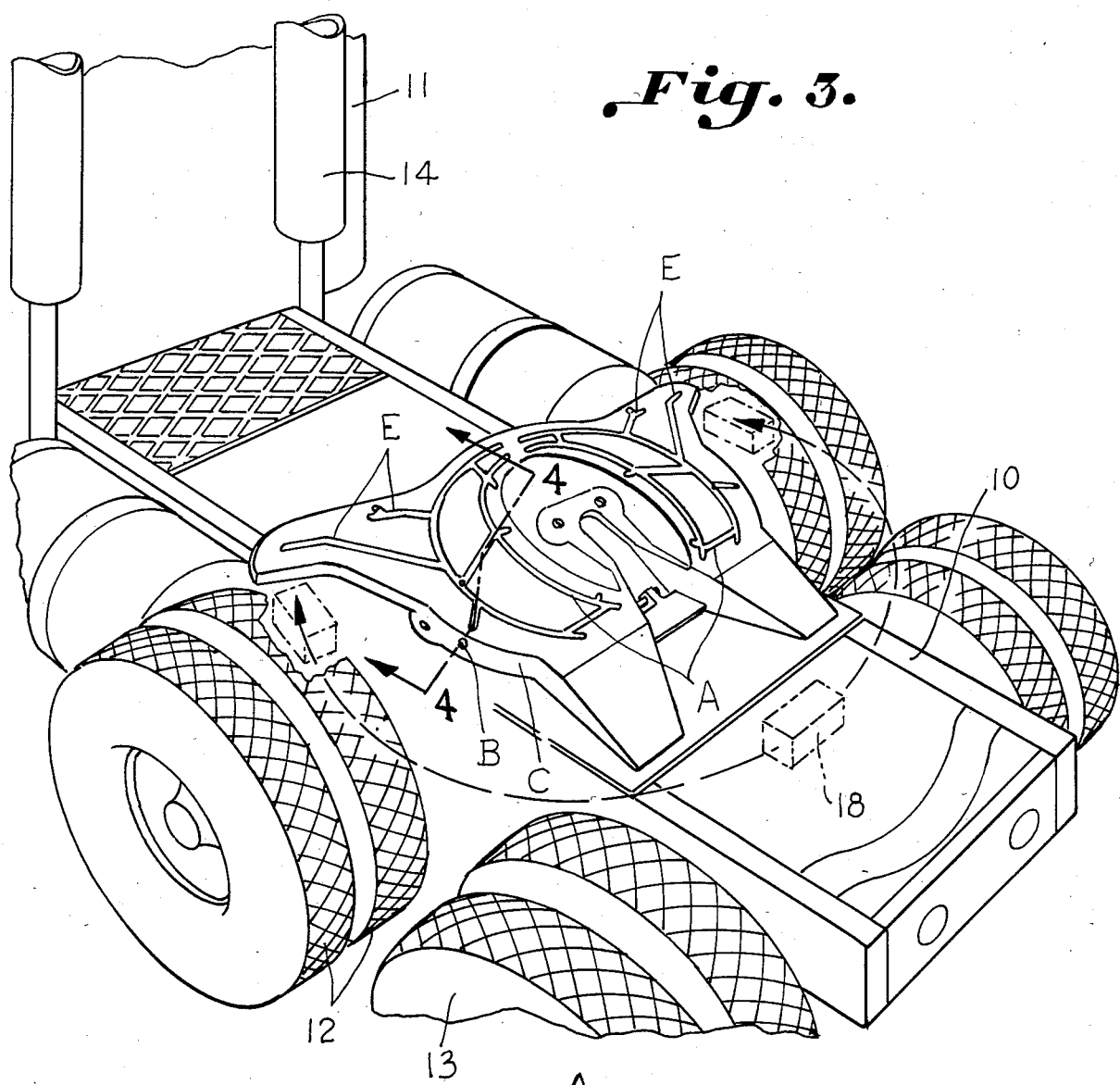
FIG. 3 is an enlarged perspective view illustrating the angular mounting of the fifth wheel upon the tractor for tilting movement about a transverse axis carried about the tractor.
Figure 4:
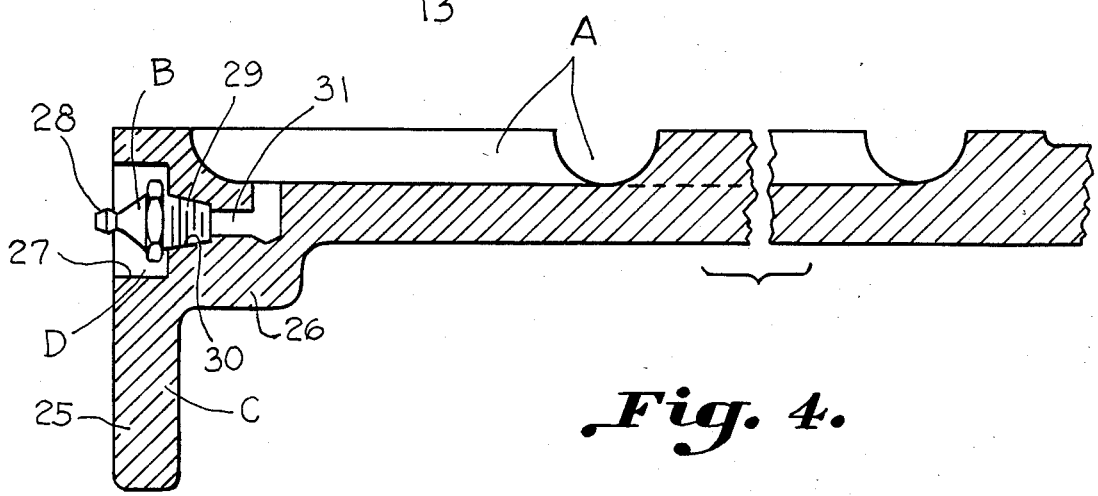
FIG. 4 is an enlarged transverse sectional elevation taken on the line 4—4 in FIG. 3.

Referring more particularly to the FIGS. 3-7, it will be observe that the fifth wheel has an upper or bearing surface 20 of an upper plate of the fifth wheel which carries the depending skirt C. The depending skirt contains a compartmentalized lower portion, the compartments being defined by vertical partitions 21, such as illustrated in FIG. 6. The compartmentalized portions are omitted toward the rear of the fifth wheel which is solid so that the fifth wheel will be normally tilted downwardly rearwardly when the trailer has been removed so as to facilitate securement of the trailer with positioning of the pin in proper relation to the fifth wheel for attachment of the trailer to the tractor.

The interconnected grease channels A are supplied with lubricant through opposed grease fittings B which are carried in side portions 25 of the skirt. Suitable boss members 26 define housings having recessed portions 27 therein for containing the grease fittings B each have a nipple 28 and are threaded as at 29 within an innerportion 30 of the housing. Suitable passageways 31 are provided for connection with the interconnected grease channels A. The spaced housings D carry a pair of grease fittings E adjacent the forward end of the fifth wheel and the grease fittings F communicate through a passage 35 while the grease channels E are carried within the lateral extending wedge-shaped continuations 40. The wedge-shaped continuations 40 are defined by side extensions 41 of the skirt C and include an outwardly tapering surface 41a and a second surface 41b extending laterally at a more pronounced angle to form a stop surface for engaging a stop 18 carried by the trailer. The wedge-shaped members have upper surface 42 extending integrally from the upper surface 20 of the fifth wheel together with integral extension of the skirt as at 41c, (FIG. 5A).

FIG. 7 illustrates the construction of the housing D in the forward portion of the fifth wheel. The boss 43 forms a housing D for receiving a grease fitting. It will also be best observed in FIG. 7 that a boss 44 forms the grease channels A in the surface 20. The bosses for forming the housings for the grease fittings and for the grease channels preserve the integral structural integrity of the integral fifth wheel.

Accordingly, it will be observed that a fifth wheel has been provided having integral lateral extensions capable of acting to afford stability to the trailer in relation to the tractor while at the same time acting as a stop for limiting angular movement of the trailer with respect to the tractor, while at the same time providing adequate lubrication for the adjacent engaging surfaces of the fifth wheel with the trailer.

While a preferred embodiment of the invention has been described using specific terms, such description is for illustration purposes only and it is to be understood that changes and variations may be made without departing from the spirit or scope of the following claims.

What is claimed is:

1. A fifth wheel for use in connecting a tractor and a trailer having a stop carried beneath a bottom surface of the trailer for limiting relative pivotal movement between the tractor and the trailer comprising:

a plurality of interconnected grease channels opening in an upper bearing surface of an upper plate of said fifth wheel;

a plurality of circumferentially spaced grease fittings adapted to accommodate a grease gun and the like, each opening into a passageway communicating with said grease channels;

said fifth wheel having a depending skirt containing a compartmentalized lower portion and a plurality of circumferentially spaced housings in said skirt opening at the outside thereof accommodating each of said grease fittings;

wedge-shaped integral continuations of said skirt and upper plate forming spaced opposed ears carried by a forward portion of said fifth wheel for engaging said stop limiting the angular movement of the stop therebetween, relative pivotal movement between the tractor and trailer during turning being limited by the angular movement of the stop between the opposed ears;

each said ear including an extended upper bearing surface contiguous and flush with said bearing surface of said upper plate providing an increase bearing surface for supporting said trailer and providing increased stability to the trailer in relation to the tractor;

grease channels in said upper bearing surface of each of said opposed ears; and grease fitting means carried in housing means in said fifth wheel communicating with said grease channels in an upper bearing surface of each of said opposed ears.

2. The structure set forth in claim 1 wherein a pair of grease fittings is carried in spaced housings in a forward portion of said skirt communicating with said grease channels in an upper surface of each of said opposed ears, and a pair of grease fittings is positioned in opposed relation in side portions of said fifth wheel also communicating with said grease channels in said upper plate portions of said opposed ears.

3. The structure set forth in claim 1 wherein said compartmentalized lower portion of said skirt includes first vertical partitions defining individual compartments underneath said upper plate; downward inclined trailer guide members formed at a rear of said upper plate, said partitions terminating at said guide members so that said guide members are solid members for supporting and guiding said trailer upon said upper plate.

4. A fifth wheel for use in connecting a tractor and a trailer of the type having an upper plate with lateral projections symmetrically located and laterally extending on said fifth wheel for limiting the relative pivotal movement of said tractor and trailer to prevent engagement between the sides thereof, a first plurality of grease channels formed and opening in a bearing surface of said upper plate for distributing grease to lubricate said upper plate, wherein the improvement comprises:

a depending skirt extending downwardly about a periphery of said upper plate having a compartmentalized lower interior;

lateral extensions formed as one-piece extensions of said upper plate including extended bearing surfaces flush with said bearing surface of upper plate providing an enlarged bearing surface for supporting said trailer and providing increased stability to the trailer in relation to the tractor;

a second plurality of grease channels formed and opening in said extended bearing surfaces of said lateral extensions in fluid communication with said first plurality of grease channels in said upper plate; and each said lateral extension including depending sides defined as a side extension of said skirt symmetrically on opposing sides of said skirt including a first tapering surface extending outwardly from said skirt and a second abutment surface extending from said first tapering surface at a more pronounced angle to said skirt to form an abutment for engaging a stop on said trailer to limit said relative pivotal movement.

5. The fifth wheel of claim 4 including a first plurality of recessed housings formed in said skirt, and a grease fitting carried within each said housing communicating with said grease channels for filling said channels with grease.

6. The fifth wheel of claim 4 including a second plurality of recessed housings formed in said depending side of said skirt depending from said lateral extensions, a grease fitting formed in each of said second plurality of housings for delivering grease to said second plurality of grease channels.

* * * * *